Dec. 8, 1959
M. R. CURRIE
2,916,658
BACKWARD WAVE TUBE
Filed July 22, 1955
4 Sheets-Sheet 1
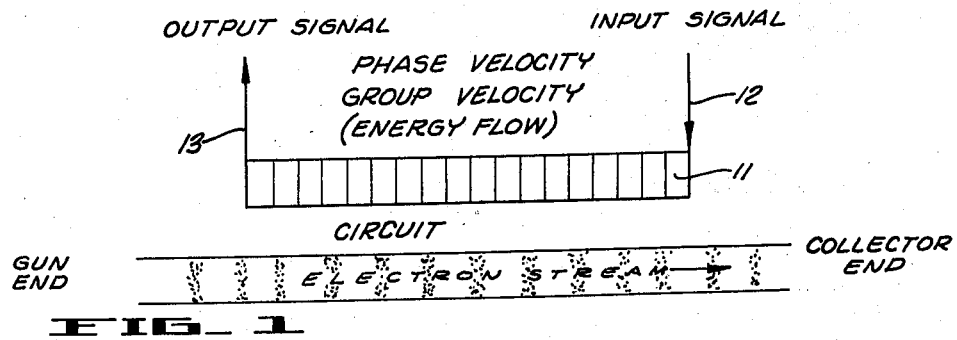
FIG_1
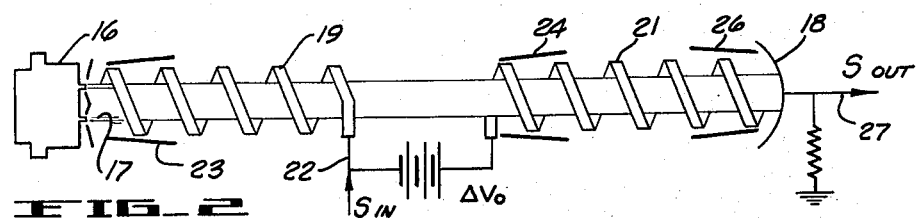
FIG_2
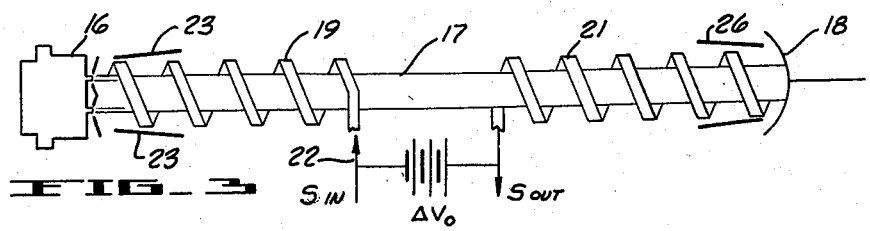
FIG_3
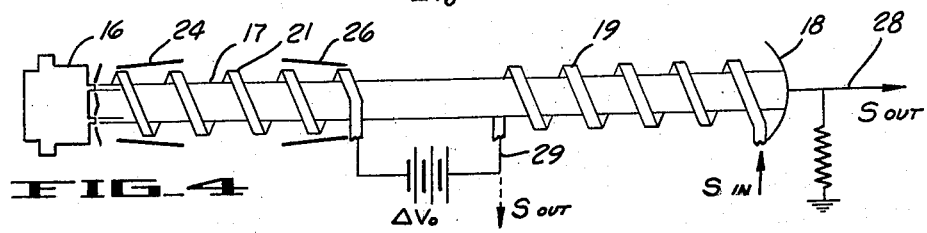
FIG_4
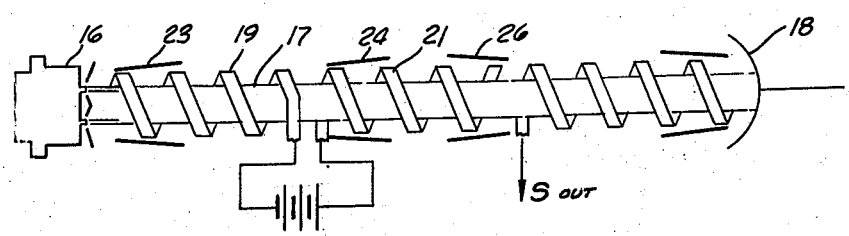
FIG_5
INVENTOR.
MALCOLM R. CURRIE
BY
ATTORNEYS Dec. 8, 1959　　　M. R. CURRIE　　　2,916,658
BACKWARD WAVE TUBE
Filed July 22, 1955　　　4 Sheets-Sheet 2
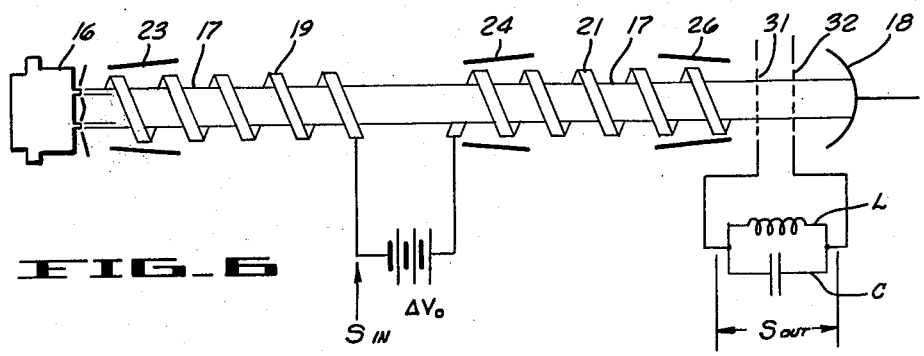
FIG_6
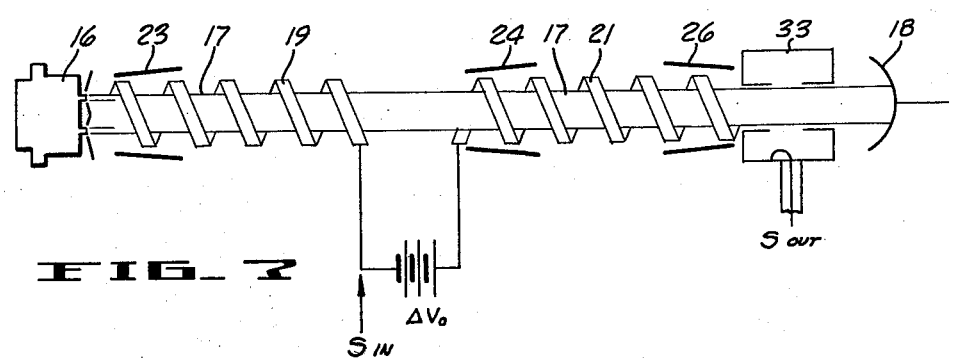
FIG_7
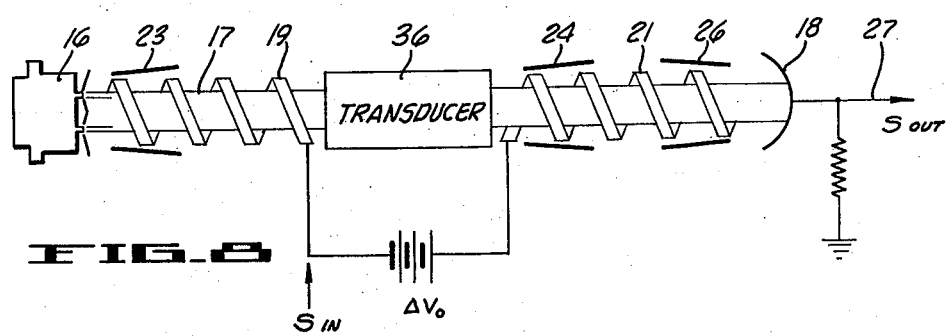
FIG_8
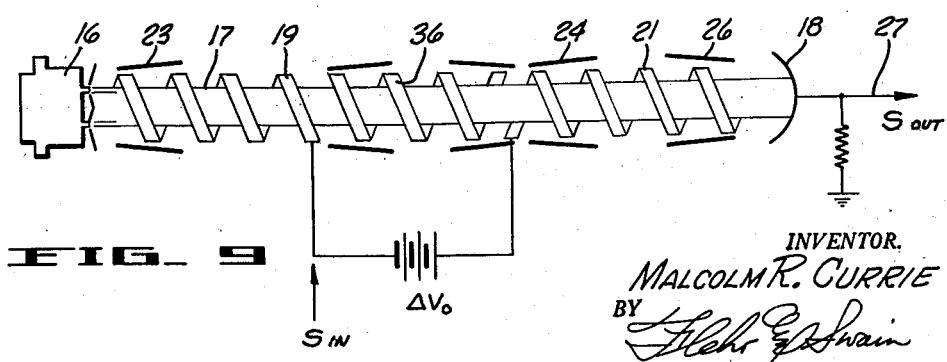
FIG_9
INVENTOR.
MALCOLM R. CURRIE
BY
ATTORNEYS Dec. 8, 1959  M. R. CURRIE  2,916,658
BACKWARD WAVE TUBE
Filed July 22, 1955  4 Sheets-Sheet 3
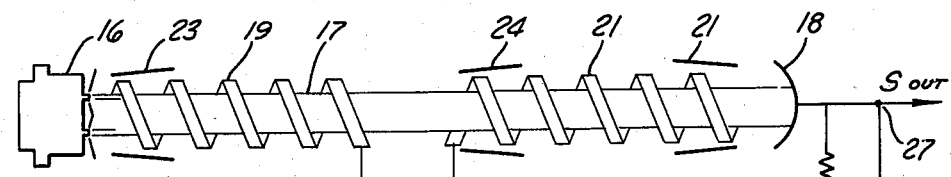
FIG_10
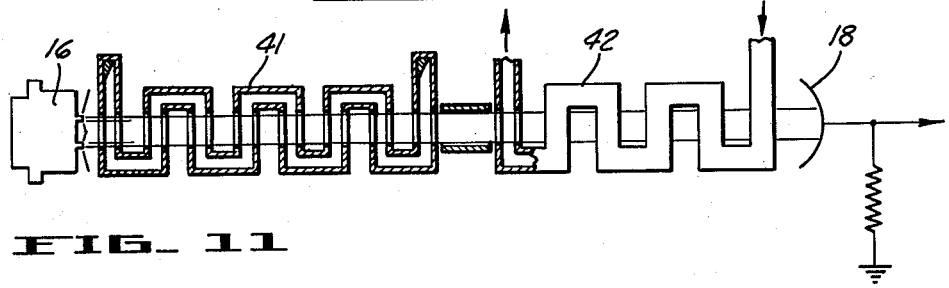
FIG_11
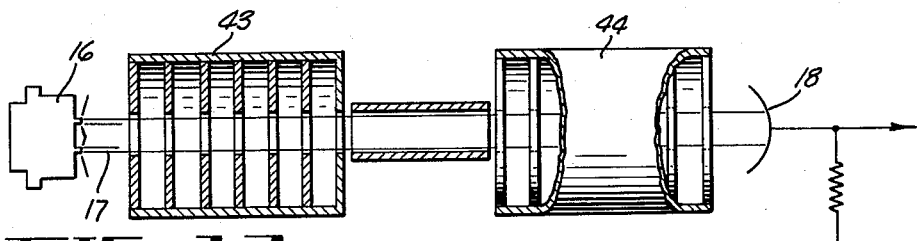
FIG_12
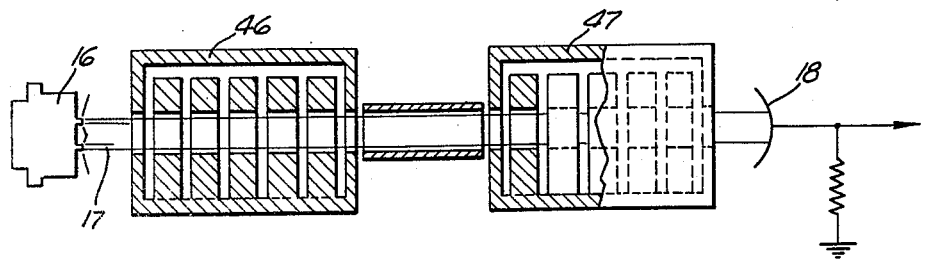
FIG_13
INVENTOR.
MALCOLM R. CURRIE
BY
ATTORNEYS Dec. 8, 1959     M. R. CURRIE     2,916,658
BACKWARD WAVE TUBE
Filed July 22, 1955     4 Sheets-Sheet 4
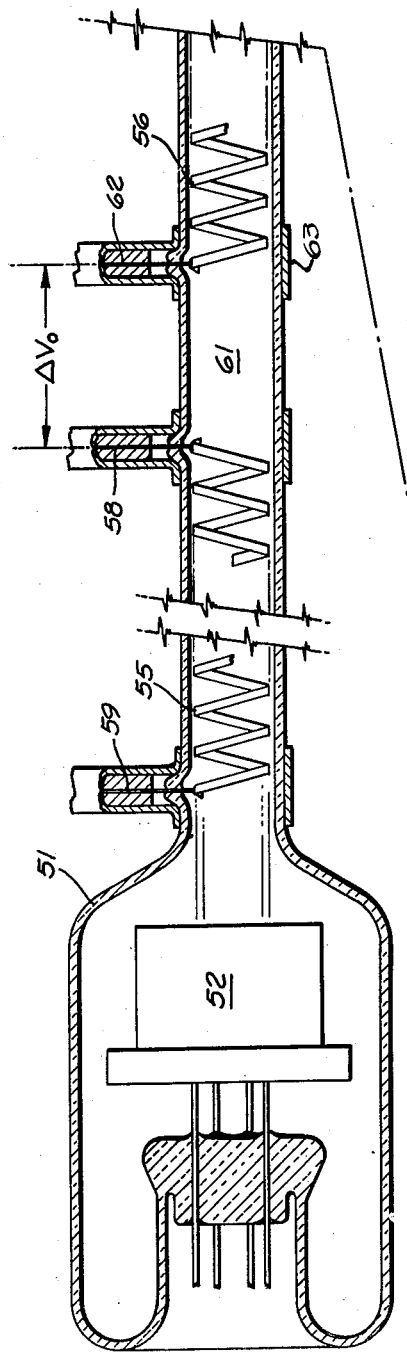
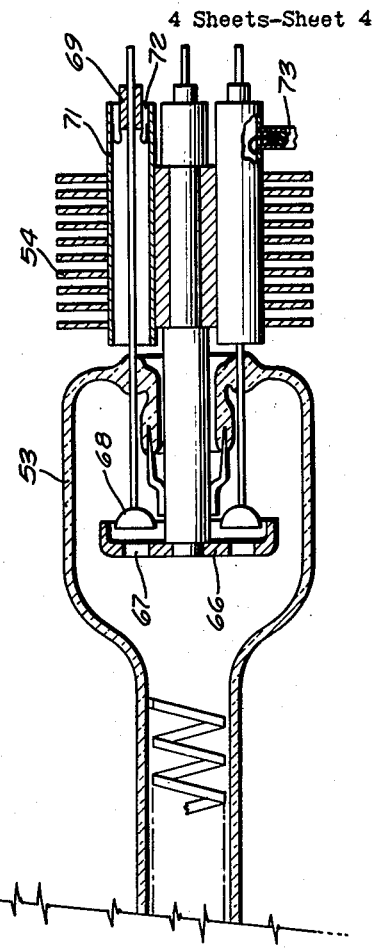
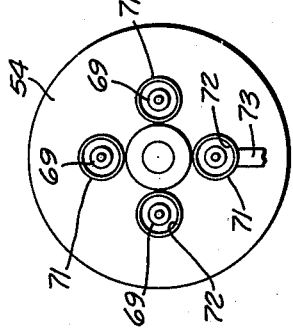
INVENTOR.
MALCOLM R. CURRIE
BY
ATTORNEYS United States Patent Office 2,916,658
Patented Dec. 8, 1959

2,916,658

BACKWARD WAVE TUBE

Malcolm R. Currie, Beverly Hills, Calif., assignor to The Regents of the University of California, Berkeley, Calif., a corporation of California Application July 22, 1955, Serial No. 523,642

17 Claims. (Cl. 315—3.6)

This invention relates generally to backward wave tubes and more particularly to a backward wave converter tube.

Traveling wave apparatus operates on the exchange of energy between an electron beam and an electromagnetic wave which is suitably coupled thereto. Generally, the electromagnetic wave is propagated along a periodic structure. The wave travels along the structure with the speed of light, but its phase velocity in the direction of the electron beam is dependent upon the configuration of the structure. The velocity in the direction of the beam corresponds to the velocity of the beam.

The electromagnetic lines extend away from the periodic structure and couple with the electron beam. Thus, there is continuous interaction between the wave traveling along the periodic structure and the electron beam. As a result of the interaction, energy is transferred from the electron beam to the electromagnetic wave.

Traveling wave tubes fall into two broad classifications. The first type of tubes are those in which the group and phase velocity of the electromagnetic wave are both in the direction of the electron beam. These tubes are referred to as forward traveling wave tubes. The second type of apparatus comprises backward traveling wave tubes which are inherently narrow band. In these devices the electromagnetic wave has a phase velocity which is in the same direction as the electron beam, but a group velocity (energy flow) opposite thereto. The latter type of tubes have the characteristic that they are voltage tunable, that is, by varying the beam voltage it is possible to tune the tube to any predetermined frequency.

Operation of both devices is inherently the same. The electron stream has a velocity which is slightly greater than the phase velocity of the electromagnetic wave traveling along the periodic circuit. Due to the interaction between the electromagnetic wave and the electron beam, the electrons in the beam are velocity modulated, that is, the electrons are bunched. The bunching takes place by some of the electrons speeding up while others are slowed down. If the speeding up and slowing down were exactly equal, no amplification or oscillation could result. Fortunately, it turns out that the two quantities are not exactly equal. There is bunching around the slow moving electrons, thus reducing the mean velocity and hence the kinetic energy of the electron beam as a whole. This increment of kinetic energy is transferred to the electromagnetic wave and results in the wave being amplified.

The backward wave device is inherently regenerative in the sense that the energy flow loop is established by oppositely directed movement of energy in the wave circuit and on the beam. If there is sufficient coupling between the electron stream and the circuit wave, the bunching induced on the stream can become large enough to produce the initial field causing the bunching; under these conditions the tube oscillates.

In certain applications it becomes important to detect a microwave signal and to convert it into low intermediate frequency. In the usual method a local oscillator is swept in frequency. The local oscillator output is mixed with the incoming signal and an intermediate frequency signal results. The mixed signal includes components which have the same frequency as the original signals, that is, the incoming signal and the oscillator signal. There are also components having frequencies equal to the sum and difference of the two frequencies and possibly higher components. If the intermediate frequency amplifier is chosen to respond to the intermediate frequency, two responses will be seen. Namely, when the local oscillator frequency is $f_0$ below the incoming signal, and when it is $f_0$ above the incoming signal. These responses are often troublesome in interpreting the output of the intermediate frequency amplifier.

Prior art traveling wave mixers have employed the forward wave principle. The local oscillator frequency is introduced on one periodic structure which serves to modulate the beam. The incoming signal is placed on another structure which likewise velocity modulates the stream. Means are provided for coupling the intermediate frequency from the electron stream. The disadvantage of forward wave mixer tubes of this type is that they require a separate oscillator. It has been suggested that one of the helices may be terminated so that the reflections set up cause this section to oscillate. But forward wave oscillators are inherently unstable and are not voltage tunable. Thus a traveling wave converter tube of this type has the inherent disadvantage that it can be designed only for a particular frequency and cannot be employed at other frequencies.

It is an object of the present invention to provide an improved backward wave converter tube.

It is a further object of this invention to provide a backward wave mixer tube in which the signals are electronically mixed by backward wave interaction.

It is a further object of this invention to provide a backward wave converter tube in which one section of the tube serves as the oscillator and another section as the pre-amplifier, and which electronically mixes the incoming signal and the local oscillator signal.

It is a further object of the present invention to provide a backward wave converter tube which is a combined filter, pre-amplifier, local oscillator and mixer.

It is still a further object of this invention to provide a backward wave converter tube in which a constant intermediate frequency output may be obtained.

These and other objects of the invention will appear more clearly from the following description when taken in conjunction with the accompanying drawings.

Referring to the drawings:

Figure 1 is a schematic model of a backward wave circuit;

Figure 2 is a schematic view of a backward wave converter tube in which the output signal is coupled off at the collector;

Figure 3 is a schematic view of a backward wave converter tube in which the output signal is coupled off at the second section;

Figure 4 is a schematic view of another backward wave converter tube in which the output signal is obtained at the collector;

Figure 5 is a schematic view of a backward wave converter tube in which the signal is coupled off the beam by means of a periodic structure;

Figure 6 is a schematic view of a backward wave converter tube in which the output signal is coupled off the beam by means of grids;

Figure 7 is a schematic view of another backward wave converter tube in which the output signal is coupled off the beam by means of a cavity;

Figure 8 is a schematic view of another backward wave converter tube in which the amplifier and oscillator sections are separated by a transducer;

Figure 9 is a schematic diagram of a tube of the type shown in Figure 8 in which the transducer section is of the helix type;

Figure 10 is a schematic diagram of another backward wave converter tube in which means are provided for obtaining an output signal having a constant frequency;

Figure 11 shows another embodiment of a backward wave converter tube in which the periodic structures comprise zig-zag waveguides;

Figure 12 is a schematic view of another backward wave converter tube which employs loaded waveguide periodic structures;

Figure 13 shows another backward wave converter tube in which the periodic structures comprise ridged waveguides with traverse slots;

Figure 14 is a side elevational view of a backward wave converter tube constructed in accordance with my invention; and Figure 15 is an end view of the tube shown in Figure 14.

Referring to Figure 1, a schematic model of a backward wave circuit is shown. An electron stream is shown traveling from the gun end to the collector end of the tube. A periodic circuit 11 is placed adjacent the electron beam. An input electromagnetic wave is introduced at the collector end 12 and travels along the periodic structure to the gun end 13. Although the wave travels along the structure at the speed of light, the structure is so constructed that its phase velocity will be only slightly less than the velocity of the electron stream. The phase velocity as in the direction of the electron beam and opposite the group velocity as previously described. The circuit is inherently regenerative, since in the electron beam energy travels from the gun end to the collector end, while the group velocity or energy flow on the periodic structure is from the collector end to the gun end.

As is well known, circuits of this type are inherently narrow band devices. The frequency band for which the device operators can be controlled by controlling the electron beam velocity, that is, the cathode-helix voltage. Devices of this type are electronically tunable by varying this voltage. The start oscillation point is determined by the electrical length of the circuit and the beam current. Thus, when the length of the circuit of beam current is such that the regenerative action produces the initial field, the tube oscillates. As is well known, the electrical length depends upon the frequency of operation. Thus a change in beam velocity will affect the electrical length of the circuit.

As previously described, the interaction between the electron stream and the electromagnetic wave traveling along the show wave circuit lying adjacent thereto velocity modulates the electron beam. As a result, the electrons bunch about the slow moving electrons. Consequently, certain regions of the beam have higher electron density than others.

The backward wave converter tube may be generally described as follows: two backward wave circuits are placed in cascade along an electron beam. One of these circuits has its electrical length so chosen that for operation at a particular value of beam current, the section is above start oscillation and therefore acts as a backward wave oscillator. This oscillator velocity modulates the electron stream in accordance with its oscillation frequency. The other circuit has its electrical length so chosen that at the particular value of beam current it operates as an amplifier rather than an oscillator. The input signal is applied to this section. The signal is amplified and the electron beam is velocity modulated in accordance with the frequency of the signal. If the oscillator and signal frequencies are different, the electron stream will be velocity modulated with two frequencies. For example, different frequencies may be obtained by operating the two sections at different potentials. The two modulations are mixed electronically on the beam to produce an intermediate frequency. Suitable means are provided to couple the intermediate frequency of the beam.

Referring to Figure 2, a backward wave converter tube is schematically shown. The electron gun 16 serves to project an electron beam 17 which is received by the collector 18. The beam is shown coupled to a pair of helical structures 19 and 21 which propagate the electromagnetic wave. It is to be understood that many other structures well known to those in the art may be employed to propagate the electromagnetic wave. The helical structures are shown for purposes of illustration and the invention is not to be limited in this respect. The length of the structure 19 is such that it operates as an amplifier for the range of beam currents under consideration. The input signal $S_{in}$ is applied to the helix by suitable means, for example, a suitable coaxial to helical transition. The end of the helix nearest the electron gun is suitably terminated. For example, the inner surface of the glass envelope may be coated with aquadag, or the last few convolutions of the helix may be coated with attenuating material. The input signal travels along the helix at the velocity of light but has a phase velocity in the direction of the electron beam which corresponds to the velocity of the beam. The input wave interacts with the electron beam and is amplified. The electrons traveling in the beam are velocity modulated as a result of the interaction.

The second periodic structure 21 has a length such that it oscillates for the particular value of beam current. This section is suitably terminated 24 and 26. For example, it may be terminated as previously described. The section oscillates at a frequency which corresponds to the beam voltage. If the two sections 19 and 21 are directly interconnected, the amplifier is tuned to the same frequency modulated as the oscillator. The beam would be further velocity modulated by the oscillator at the same frequency as the amplifier modulation. By introducing a potential difference $\Delta V_0$ between the two sections, the oscillator section 21 will oscillate at a slightly different frequency than the frequency of operation of the amplifier section. Thus the electron stream is velocity modulated at one frequency by the amplifier section and at a slightly different frequency by the oscillator section. The modulation produced in the beam is electronically mixed. The output signal may be removed at the collector as shown at 27. A resistor is connected between the collector and ground and the signal is taken off the resistor.

For optimum mixing of the signals, it is desirable that the relative signal strengths of the amplifier and oscillator section be nearly equal. This may be accomplished by suitably attenuating the amplifier or oscillator section. For example, attenuating material may be placed on the glass envelope adjacent the helix or periodic structure to thereby attenuate the signal. The signal strength of one section may be increased to compensate for the differences. This may be accomplished by inserting a transducer between the oscillator and amplifier section to thereby increase the bunching. Transducers of this type will be presently described.

In Figure 3, I have shown another backward traveling wave converter tube in which like parts carry the same reference numerals as the backward traveling wave converter tube described and illustrated in Figure 2. In this backward traveling wave converter tube the output signal is obtained at the second helix rather than at the collector.

In Figure 4, I have shown another backward traveling wave converter tube in which the oscillator section is disposed at the gun end of the beam. Again, the electron gun 16 serves to project the electron beam 17 which is collected by the collector 18. The periodic structure 21, in this case, a helical structure, is suitably chosen so that this section of the tube oscillates at a frequency determined by the beam voltage. This section is match terminated at its ends 24 and 26. The amplifier section comprises a periodic structure 19, in this instance, a helical structure. The input signal $S_{in}$ is introduced at the collector end. The output signal may be obtained at the collector 28 or from the periodic structure 29, whichever is more suitable.

Referring to Figure 5, another traveling wave converter tube is shown. This converter tube comprises two sections of the type previously described. This tube includes different means for coupling the signal off the electron stream. The reference characters have been described with respect to Figure 2, and therefore the general description of the tube will not be repeated. The signal (intermediate frequency) is coupled off the electron beam by means of a third periodic structure placed in cascade with the oscillator and amplifier sections. This structure is chosen so that its frequency of operation is the intermediate frequency. It is of course to be understood that the position of the oscillator and amplifier sections may be interchanged, as previously described.

In Figure 6, a backward traveling wave converter tube which includes grid means for coupling off the intermediate frequency is shown. Again, the reference numbers are similar to the reference numbers previously used and indicate like parts. The grids 31 and 32 are coupled to the electron beam. Thus, a signal appears on the grids which corresponds to the electronic modulation carried by the beam. The grids may be connected to a tuned circuit. If the intermediate frequency is sufficiently low, the tuned circuit may be of the lumped-constant type, for example, a parallel circuit including an inductance L and a capacitance C. The output signal is developed across the tuned circuit. If the intermediate frequency is higher, the tuned circuit may be of the distributed constant type. Operation of the circuit is not changed by such substitution.

In Figure 7, I have shown a converter tube in which like reference numbers indicate like parts, as previously described. A cavity 33 is shown coupled to the electron beam. The cavity 33 illustrates the principle of using a distributed constant tuned circuit to obtain the intermediate frequency. It should be repeated at this point that, although I have shown the section preceding the oscillator section in the various circuits shown, the position of the oscillator and amplifier along the electron stream may be interchanged without departing from the spirit of this invention. Such modifications are intended to be covered by the descriptions which have preceded.

As previously described, better electronic mixing may be obtained if the amplifier and oscillator modulation have the same relative signal strengths. In Figure 8, I have shown a traveling wave converter tube in which like reference numbers again indicate like parts. As shown, the backward traveling wave converter tube comprises an amplifier section adjacent the electron gun and an oscillator section adjacent the collector. A transducer 36 is interposed between the amplifier and oscillator section. The transducer 36 serves to isolate the sections. The transducer also serves to transform the velocity and current modulation which exists on the beam at the end of the first section so as to optimize its output signal. In the general case, the transducer can consist of any combination of propagating or non-propagating circuits. The transducer may consist merely of a drift tube in analogy to the klystron, although the drift tube is not essential to the bunching mechanism. In certain cases it is advantageous to employ a transducer which has the same type of structure as the structures 19 and 21. Thus, as shown in Figure 9, the transducer might be a floating helix. The transducer can consist of an arbitrary number of floating circuits between the first and second sections with each contributing to the over-all bunching of the first section. The bandwidth can be adjusted to some degree by stagger tuning the various elements of the transducer. Thus it is seen that by providing a transducer 36 it is possible to increase the bunching due to the input signal. Generally, the signal on the amplifier section is weaker, and therefore this signal is the one that requires increased bunching.

The theoretical analysis of transducers of this type has been covered in detail in the aforementioned co-pending application.

Referring to Figure 10, a backward traveling wave converter tube of the type described in detail with respect to Figure 1 is shown. This tube includes means whereby the intermediate frequency is maintained constant regardless of variations in input or oscillator frequency. Again, like reference numbers refer to like parts. The output signal is fed to a discriminator which provides a D.-C. signal. The D.-C. signal which is applied to the D.-C. power supply 38. The output voltage of the D.-C. power supply is controlled by this signal. Thus, by appropriately connecting the discriminator and D.-C. power supply, it is possible to vary the voltage between the first and second sections $\Delta V_0$ whereby the difference of frequency is maintained constant.

In Figures 11, 12 and 13, other embodiments of backward traveling wave converter tubes are shown. Again, like reference numbers refer to like parts. Thus, the electron gun 16 serves to project a beam 17 which is received by the collector 18. The backward traveling wave converter tube in Figure 11 employs zig-zag waveguide sections 41 and 42 as the periodic structures. Operation of the device is similar to the operation of the previous converter tubes and will not be described in detail. Figure 12 employs loaded waveguide periodic structures 43 and 44 while the periodic structures 46 and 47 shown in Figure 13 are of the ridged waveguide type with traverse slots.

Referring particularly to Figures 14 and 15, I have shown a backward traveling wave converter tube which incorporates my invention. The converter tube comprises generally an evacuated glass envelope 51. The electron gun 52 is disposed at one end of the envelope and a special collector designated generally by the reference numeral 53, and having cooling fins 54, is disposed at the other end and serves to collect the electrons and provide the output signal as will be presently described.

The electron gun is of the hollow beam type. It may be of the type disclosed by Pierce in "Theory and Design of Electron Beams," D. Van Nostrand Company, 1954. A first helix 55 is located adjacent the electron gun and a second helix 56 is located adjacent the collector. A drift region 61 is provided between the helices. As previously described, transducers may be inserted between the helices and serve to enhance the modulation of the beam as it travels through the region. In certain other instances, it may be possible to eliminate this region entirely and place the helices adjacent one another.

The input signal is introduced at the collector end 58 of the amplifier section and is amplified as it travels towards the gun end of the tube. The amplified signal may be dissipated in suitable helix termination, or it may be removed at the terminal 59, if desired. As shown, the end of the helix adjacent the gun is connected to an external coaxial line to provide for measuring the amplified signal or for connection to an external attenuating means. It is to be understood of course that this end of the helix may not be brought out, but may be terminated within the tube by placing aquadag or other suitable attenuating material on the envelope or on the turns of the helix.

As previously described, when a signal is applied to the helix, a wave traveling along the helix interacts with the electron beam and tends to bunch or velocity modulate the beam. The modulated electron beam then passes through the drift region 61, although this is not essential to operation, and into a second section which has its length chosen to act as an oscillator. The second helix 56 may have its ends brought out and connected to suitable terminations, or the circuit may be suitably terminated within the envelope. The gun end of the helix 56 is brought out to a suitable type BNC connector. The intermediate frequency may be coupled off the beam at 62. The electromagnetic waves traveling along the helix interact with the electron beam and modulate the beam in accordance with the frequency of oscillation.

Generally, a transition from a coaxial line to a helical structure introduces a large standing wave ratio (reflections). It is therefore desirable to provide a suitable tapered connection or a connection of the type shown. A ring 63 is placed about the tube and interconnects with the outside of the coaxial line. Thus, the transition is gradual from a coaxial line to a helix.

To maintain a closer balance of the helix dimension and to match the helices, special precautions are required in forming the helices. One method which may be employed and is worth noting is that of forming the two helices adjacent one another on a mandrel. The resulting gap between the helical turns may have a wire wedged therebetween to form a solid cylinder about the mandrel. The helices and cylinder are then first to set the helix material. The resulting structure is extremely uniform; the pitch tolerances are very close with small cumulative errors over their entire length.

Construction of the envelope may also require special techniques. For example, the envelope may be constructed by shrinking the glass onto a mandrel in which three longitudinal grooves have been milled. The resulting envelope will be fluted. The helix is then fitted snugly into the fluted envelope and is relatively free of dielectric loading.

The intermediate frequency may be removed by placing a resistor between the collector and ground and taking the difference frequency off the resistor. A specially constructed collector may be employed. Such a collector is illustrated and described. Thus, the collector 66 is formed with a plurality of holes 67. These holes are located at a radius which corresponds to the radius of the electron beam. Portions of the beam do not strike the collector, but pass through these openings. A plurality of second collectors 68 are disposed opposite the holes and collect the electrons which pass through the holes. These collectors 68 are connected by a conductor 69 to the cavity 71. A tuning plunger 72 is provided at one end of the cavity. Suitable means 73 are connected to the cavity for coupling off the electromagnetic energy. Thus by moving the plunger 72, the cavity 71 may be tuned to the intermediate frequency of the energy which is collected by the collector 68. Figure 15 is an end view of the collector assembly and shows an assembly which comprises four cavities which are located on a circle and disposed at equal angular positions from one another.

A backward traveling wave converter tube of the type shown was constructed for S-band operation. The tube utilized a hollow beam gun, tape helices for the backward interaction structures, and a drift space between the helices. The amplifier helix was 4.3 inches long, .922 inside diameter, and had a .266 inch pitch. The drift region was ¾ inch. The oscillator helix 56 had the same pitch and internal diameter as the amplifier helix, but the length was 6.5 inches. Both ends of the amplifier helix and the gun end of the oscillator helix were brought out to type BNC angle connectors.

The backward traveling wave converter tube was operated on a beam voltage of 350–3000 volts, and a voltage difference $\Delta V_0$ between the amplifier and oscillator section of 50–100 volts. The helix voltages were so adjusted that the oscillator section operated at 100 mc. above the R.-F. input signal. The R.-F. input signal was varied from 2200–3400 mc., an intermediate frequency of 100 mc. was obtained at the output.

It is of course apparent that although I have described my backward traveling tube as a converter tube, it is possible to choose the length of the periodic structures so that both are operating as amplifiers for the selected beam current. Thus a voltage difference may be applied to the two structures whereby each of them are tuned to a different frequency. The input signals are then applied to each of the structures and the signals each modulate the beam. The modulation is electronically mixed along the beam. Suitable means may then be provided for extracting the difference frequency. In such application, the tube is acting as a conventional mixer tube rather than a converter tube.

It is seen that I have provided a backward traveling wave tube in which the electron beam is modulated by two frequencies. The modulation is electronically mixed along the beam and suitable means are employed to extract the difference frequency from the beam. The input signals are fed to backward wave structures which extend a plurality of wavelengths along the electron beam and are amplified as they travel along the periodic structures. Thus, the tube not only serves the purpose of mixing, but also serves the purpose of amplifying the input signals. Backward traveling wave tubes are electronically tunable and respond only to a narrow band of frequencies. Thus, the backward traveling wave tube described also serves the purpose of a filter. By properly choosing one of the sections, it may be made to act as an oscillator thereby providing the local oscillator. In this instance the tube becomes a converter tube. Thus, in a single tube I have provided the combination of filter preamplifier, local oscillator, and electronic mixer.

I claim:

1. A backward traveling wave tube comprising an electron gun serving to project an electron beam, a collector spaced from said gun and serving to receive said beam, a backward wave oscillator section serving to velocity modulate said beam in accordance with its frequency of oscillation, a backward wave amplifier section serving to receive and amplify a signal and velocity modulate the beam in accordance therewith, said modulations mixing electronically along the beam to produce a difference frequency, and means for coupling the difference frequency off said beam.

2. Apparatus as in claim 1 wherein said means for coupling the difference frequency off the beam comprises at least one resonant cavity associated with the collector.

3. Apparatus as in claim 1 wherein said means for coupling the difference frequency off said beam comprises a pair of spaced grids coupled to said beam.

4. Apparatus as in claim 1 wherein said means for coupling the difference frequency off said beam comprises a resonant cavity coupled to the beam.

5. Apparatus as in claim 1 wherein the said means for coupling the difference frequency off said beam comprises a periodic structure in cascade with the oscillator and amplifier sections.

6. Apparatus as in claim 1 wherein a voltage is applied between the oscillator and amplifier sections whereby the sections operate at different frequencies.

7. A backward traveling wave tube comprising an electron gun serving to project an electron beam, a collector spaced from said gun and serving to receive said beam, a first structure disposed to interact with said beam, said structure forming a backward wave oscillator whereby the beam is modulated in accordance with its frequency of oscillation, a second structure disposed to interact with said beam, said structure forming a backward wave amplifier serving to amplify the input signal whereby the beam is modulated in accordance with the input signal, the two modulations mixing electronically on the beam to produce a difference frequency, and means for extracting the difference frequency from said beam.

8. Apparatus as in claim 7 wherein said first and second structures comprise helical transmission lines.

9. Apparatus as in claim 7 wherein a voltage is applied between the first and second structures whereby the oscillator and amplifier operate at different frequencies.

10. A backward traveling wave tube comprising an electron gun serving to project an electron beam, a collector spaced from said gun and serving to receive said beam, a backward wave oscillator section serving to velocity modulate said beam in accordance with its frequency of modulation, a backward wave amplifier section serving to receive and amplify a signal to velocity modulate the beam in accordance therewith, a transducer disposed between said oscillator and said amplifier sections, the said modulations mixing electronically along said beam, and means for coupling the difference frequency off said beam.

11. Apparatus as in claim 10 wherein a voltage is applied between the oscillator and amplifier sections whereby the sections operate at different frequencies.

12. Apparatus as in claim 10 wherein a voltage is applied between the oscillator and amplifier sections, said voltage varying in accordance with the output frequency whereby the sections operate at a constant difference frequency.

13. A backward traveling wave tube comprising an electron gun serving to project an electron beam, a collector spaced from said gun and serving to receive said beam, a backward wave oscillator section serving to velocity modulate the beam in accordance with its frequency of oscillation, a backward wave amplifier section serving to receive and amplify a signal to thereby velocity modulate the beam in accordance therewith, said modulations mixing electronically along said beam to produce a difference frequency, means including a discriminator connected to said collector and serving to provide an output voltage which corresponds to the difference frequency, a voltage supply connected between the oscillator and amplifier sections, said voltage supply having its output voltage controlled by the output voltage of the discriminator section, whereby the difference frequency is held substantially constant.

14. A backward traveling wave tube comprising an electron gun serving to project an electron beam, a collector spaced from said gun and serving to receive said beam, a first periodic structure disposed to interact with said beam, said structure forming a backward wave oscillator whereby the beam is modulated in accordance with its frequency of oscillation, a second periodic structure disposed to interact with said beam, said structure forming a backward wave amplifier serving to amplify an input signal whereby the beam is modulated in accordance with the input signal, a transducer disposed between said first and second periodic structures and serving to impart further modulation to the electron beam leaving the first structure, the two modulations mixing electronically to produce a difference frequency, and means for extracting the difference frequency from said beam.

15. Apparatus as in claim 14 wherein a voltage is applied between the first and second periodic structures whereby the oscillator and amplifier sections operate at different frequencies.

16. Apparatus as in claim 14 wherein said means for extracting the difference frequency from said beam comprises a pair of spaced grids coupled to said beam.

17. A backward wave tube comprising an electron gun serving to project an electron beam, a collector spaced from said gun and serving to receive said beam, a first periodic structure serving to propagate a backward electromagnetic wave disposed whereby the fields of the propagated wave interact with the beam to modulate the beam in accordance therewith, a second periodic structure serving to propagate a second backward electromagnetic wave disposed whereby the fields of the propagated wave interact with the beam to modulate the beam in accordance therewith, means for applying a voltage between the first and second periodic structures whereby the structures operate at different frequencies whereby the beam is modulated to form a difference frequency thereon, and means for coupling off the difference frequency.

References Cited in the file of this patent

UNITED STATES PATENTS

| | | |
|---|---|---|
| 2,584,308 | Tiley | Feb. 5, 1952 |
| 2,657,305 | Knol et al. | Oct. 27, 1953 |
| 2,699,519 | Bruck | Jan. 11, 1955 |
| 2,748,268 | Whinnery | May 29, 1956 |
| 2,753,481 | Ettenberg | July 3, 1956 |
| 2,811,664 | Kazan | Oct. 29, 1957 |
| 2,834,909 | Beaver | May 13, 1958 |

OTHER REFERENCES

Article by H. Heffner, Proc. of the I.R.E., June 1954, pages 930 to 937.

Article by Kompfner and Williams, Proc. of the I.R.E., November 1953, pages 1602 to 1611.